United States Patent

[11] 3,621,091

| [72] | Inventors | Jerome J. Hertz<br>Broomall, Pa.;<br>William E. Salvadore, South Lee, Mass. |
|---|---|---|
| [21] | Appl. No. | 856,218 |
| [22] | Filed | Sept. 8, 1969 |
| [45] | Patented | Nov. 16, 1971 |
| [73] | Assignee | General Electric Company<br>Continuation-in-part of application Ser. No. 639,295, May 18, 1967, now abandoned. |

[54] PROCESS FOR INSOLUBILIZING A POLYPHENYLENE ETHER FIBER
6 Claims, No Drawings

[52] U.S. Cl. .................................................. 264/290 R,
260/47 ET, 264/235, 264/342 R, 264/342 RE,
264/346
[51] Int. Cl. ...................................................... D02j 1/22,
C08q 23/16
[50] Field of Search ............................................. 260/47 ET;
264/176 F, 210 F, 290, 235, 342, 346, 290 R, 342 R, 342 RE

[56] References Cited
UNITED STATES PATENTS

| 3,432,466 | 3/1969 | Hay .............................. | 264/210 F |
| 3,457,343 | 7/1969 | Lohuizen et al. ............. | 260/47 ET |
| 3,476,849 | 11/1969 | Duiser .......................... | 260/47 ET |

Primary Examiner—Donald J. Arnold
Assistant Examiner—Herbert Mintz
Attorneys—William Mufatti, Frank L. Neuhauser, Oscar B. Waddell, Joseph B. Forman and Morgan, Finnegan, Durham & Pine ABSTRACT: Orienting and heat-treating polyphenylene ether fibers. Conditions include orienting by stretching 3–10X at 200°–300° C and subsequently treating at 350°–529° C. by relaxing up to 70 percent, heating at constant length or redrawing up to 5X. The processing increases crystallinity, improves tensile properties and results in fiber insolubility in various conventional drycleaning solutions.

PROCESS FOR INSOLUBILIZING A POLYPHENYLENE ETHER FIBER

CROSS-REFERENCE TO RELATED APPLICATIONS

This application is a continuation-in-part of copending U.S. Pat. application Ser. No. 639,295 filed May 18, 1967 and now abandoned.

BACKGROUND OF THE INVENTION

1. Introduction

This invention is concerned with fibers formed from polyphenylene ethers and more particularly is directed to a process for insolubilizing fibers formed from ortho diaryl substituted polyphenylene ethers by a process characterized by the step of redrawing an oriented fiber at a temperature near the melting point of the fiber.

2. Description of the Prior Art

The polyphenylene ethers are known and described in numerous publications including U.S. Pat. Nos. 3,306,874 and 3,306,875 of Allan S. Hay and U.S. Pat. Nos. 3,257,357 and 3,257,358 of Gelu Stoeff Stamatoff, all incorporated herein by reference. One process for the formation of these polymers involves the oxidative coupling of monovalent phenols using a copper-amine complex catalyst. Preferred phenols used to form the polymers have the structural formula

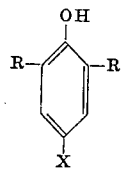

where x is a substituent selected from the group consisting of hydrogen, chlorine, bromine, and iodine; and each R is a monovalent substituent selected from the group consisting of hydrogen, halogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nucleus. Details for the formation of these polymers can be found in the above-noted patents and patent application.

A large number of the polyphenylene ethers are high performance thermoplastics having a unique combination of properties including (1) a wide useful temperature range extending from a brittle point of approximately −275° F. to a heat distortion temperature of 375° F. (at 264 p.s.i.); and (2) mechanical properties that are relatively constant over a wide temperature range; (3) excellent electrical properties over a wide range of temperatures and frequencies; (4) unusual resistances to aqueous environments including acids, bases and steam; and 5) processability on conventional extrusion and injection molding equipment. The polymers may be used for all purposes heretofore known for thermoplastics, including formation of fibers, films and shaped articles by conventional fabricating techniques, such as extrusion, hot molding and vacuum forming.

The ortho diaryl substituted polyphenylene ethers are high-melting, high-molecular weight materials readily spun into high strength fibers suitable for industrial and textile use. However, a major restriction on the use of fibers formed from these polymers is their solubility in many organic liquids including those conventionally used for drying cleaning. The solubility is believed to be due, in part, to the amorphous nature of the fibers following conventional orientating procedures.

STATEMENT OF THE INVENTION

The present invention is predicated upon the discovery that redrawing an oriented fiber formed from an ortho diaryl substituted polyphenylene ether under tension at a temperature near the melting point of the polymer causes the polymer to become substantially insoluble in various organic liquids known to be good solvents for the polyphenylene ethers. The insolubility of the polymer is believed to be due at least in part to increased crystallinity of the polymer. Oriented aryl substituted polyphenylene ether fibers are sufficiently amorphous to be soluble in many solvents. Fibers redrawn in accordance with the procedures of this invention undergo a substantial increase in crystallinity, usually in excess of 25 percent when measured along the fiber axis.

An additional factor believed to contribute to insolubility of redrawn fibers of the invention is increased crystal size resulting from the redrawing procedure. It is known in the art that as the crystal size increases for a given material, the number of dislocations and other defects common to crystalline materials decreases. It is also known in the art that crystals substantially free of dislocations and other defects are more solvent resistant than less perfect crystals. Accordingly, the crystal growth associated with the redrawing step is believed to promote solvent resistance.

In addition to improved insolubility characteristics of the redrawn fibers of the invention, as an additional advantage, it has been found that redrawn fibers have substantially improved tensile properties as indicated by increased tenacity and modulus without loss of elongation.

Accordingly, an object of this invention is to provide a process for insolubilizing fibers formed from ortho diaryl substituted polyphenylene ethers where the process is characterized by a step of redrawing an oriented fiber under tension at a temperature near the melting point of the polymer.

Another object of this invention is to provide insoluble fibers of diaryl substituted polyphenylene ethers having increased percent cyrstallinity and improved tensile properties.

Another object of this invention is to provide a drycleanable diaryl substituted polyphenylene ether fiber.

Other objects and advantages of this invention will be in part apparent and in part pointed out in the description which follows.

DESCRIPTION OF THE PREFERRED EMBODIMENTS

The polyphenylene ethers with which this invention is concerned are those having at least 100 repeating units corresponding to the structural formula

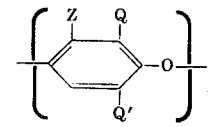

where Q is phenyl; Q' is a member selected from the group consisting of phenyl, phenyl having from one to five and preferably from one to two alkyl or halo substituents, biphenyl, terphenyl, and naphthyl and Z is hydrogen or halogen.

Fibers of the polyphenylene ethers are formed using known wet or dry spinning procedures. Spinning involves dissolving a polymer in a suitable solvent such as methylene chloride to form a solution containing from 10 to 30 percent by weight polymer. The solution is passed through a spinerette and dried in air or passed into a coagulating bath consisting of a nonsolvent for the polymer such as isopropyl alcohol. The fibers are oriented by uniaxial stretching at elevated temperatures. The elevated temperature required is dependent upon whether or not the fiber is plasticized by a solvent or any other plasticizer. For a fiber substantially free of plasticizer, the stretching temperature preferably is near the glass-transition temperature of the polymer—i.e., a temperature within 100° C. of the glass-transition temperature. Exemplary conditions for stretching a substantially nonplasticized fiber of a polyphenylene ether would include a temperature between about 200° and 300° C. at a stretch ratio of between about 3.0 and 10.0. As the amount of plasticization increases, the temperature is lowered as is known in the art.

The stretching procedure may be performed in various known ways, e.g., by using hot rolls wherein the fiver is preheated on heated feed rolls, passed through and around first stage draw rolls moving with a surface speed of about four times that of the feed rolls and then passed to and around a second set of draw rolls moving with a surface speed of about two times that of the first stage draw rolls to give a total draw ratio in a range of seven to eight. The second stage draw rolls are heated to a temperature close to the glass transition temperature of the polymer and preferably between 200° and 300° C. From the second stage draw rolls, the fibers pass to a conventional wind up system or to a further set of rolls for the redrawing procedure.

The redrawing procedure involves heating the fiber to near the melting point of the fiber, preferably within a temperature range of from about 350° C. to 520° C. and most preferably from between about 460° C. to 500° C. while maintaining the fiber under tension. Preferably, a draw ratio of from about 0.3 to 5.0, and preferably from 1.0 to 2.5 is maintained during the redrawing operation. Redraw ratios below 1.0 are suitable because upon heating, the fiber shrinks. All that is necessary is that the fiber be maintained under tension. Consequently, when the redraw ratio is below 1.0, the fiber is shrinking, but is prevented from shrinking to its full extent to maintain the fiber under tension. For example, a redraw ratio of 0.5 means that the fiber has decreased in length by 50 percent though sufficient tension has been placed upon the fiber to accomplish the objects of the invention. It has been surprisingly found that if the fiber is redrawn at a temperature below 350° C., the polymer does not exhibit insolubility, but is soluble to substantially the same extent as fibers not subjected to a redrawing step. If the temperature exceeds 520° C., the polymer loses strength and is apt to break during the redrawing procedure.

The following examples illustrate specific embodiments of the invention, all parts expressed in the examples being by weight unless otherwise indicated.

EXAMPLE 1

A solution is prepared consisting of 20 percent poly-(2,6-diphenyl-1,4-phenylene) ether in methylene chloride and dry spun in air or wet spun into a coagulating bath of isopropyl alcohol using an eight-hole spinerette with a hole diameter of 0.005 inches. Delivery rate of the polymer solution is 3 cc.'s per minute. Formed fiber is wound on a single roll godet. The godet rate is adjusted so as to remove fiber at the delivery rate of 100 feet per minute. Collected fiber is dried overnight in an air circulating oven maintained at 100° C. The so formed fiber is weak and brittle. A portion of the fiber is set aside and the remainder stretched at a stretch ratio of about eight to one and a temperature of about 250° C. A portion of the stretched fiber is set aside and the remainder redrawn at a temperature of about 480° C. with a stretch ratio of about 2.5 to 1.0. Comparative data for the so treated fibers is set forth in the following table.

| Treatment | Stretch ratio | Stretch temp., ° C. | Tenacity gms./denier | Elongation, percent | Solubility in trichloroethylene |
|---|---|---|---|---|---|
| As spun | | | 0.29 | 0 | Soluble. |
| 1st stretch | 8.0:1.0 | 260 | 1.45 | 9.7 | Do. |
| 2nd stretch | 2.5:1.0 | 480 | 1.75 | 11.0 | Insoluble. |

EXAMPLE 2

The procedure of example 1 is repeated, but following the first stretch, the fiber is heated to 480° C. without maintaining the fiber under tension. The fiber is found to be soluble in trichloroethylene.

EXAMPLE 3

The procedure of example 1 is repeated, but following the first stretch, the fibers are redrawn at 200° C. with a stretch ratio of 2.5 to one. The fiber is soluble in trichloroethylene.

EXAMPLE 4

The procedure of example 3 is repeated, but the fiber is redrawn at 325° C. and is found to be soluble in trichloroethylene.

EXAMPLES 5-17

Fiber is formed and subjected to a first stretch in accordance with the procedure of example 1. The so formed fiber is divided into portions and subjected to a second redrawing at a stretch ratio of 2.5 to 1.0 at temperatures and with results as follows:

| Example No. | Stretch temp., ° C. | Denier | Tenacity, gm./d. | Elongation, percent | Percent increase in crystallinity | Intrinsic viscosity (dl./g.) |
|---|---|---|---|---|---|---|
| 5 | | 742 | 2.5 | 17 | | 0.93 |
| 6 | 280 | 570 | 2.4 | 19 | 0 | N.m. |
| 7 | 360 | 595 | 3.5 | 22 | N.m. | N.m. |
| 8 | 410 | 596 | 3.5 | 26 | N.m. | N.m. |
| 9 | 420 | 593 | 3.3 | 24 | N.m. | N.m. |
| 10 | 430 | 550 | 3.5 | 25 | 63 | N.m. |
| 11 | 440 | 550 | 3.5 | 29 | 66 | 1.16 |
| 12 | 450 | 566 | 3.2 | 26 | 67 | N.m. |
| 13 | 460 | 540 | 3.6 | 29 | 67 | N.m. |
| 14 | 570 | 507 | 3.5 | 22 | 72 | N.m. |
| 15 | 480 | 544 | 3.5 | 28 | 72 | N.m. |
| 16 | 490 | 539 | 3.4 | 27 | 73 | N.m. |
| 17 | 500 | 542 | 3.4 | 27 | 75 | 1.17 |

Various of the above samples were soaked in trichloroethylene, a known solvent for the polymer, for 2 hours with the following effects on fiber properties.

| Example No. | Elongation % | Tenacity (gm./d.) |
|---|---|---|
| 5 | dissolved | — |
| 6 | dissolved | — |
| 7 | partial dissolution | — |
| 11 | 33 | 2.9 |
| 12 | 34 | 3.1 |
| 15 | 31 | 3.2 |
| 17 | 29 | 3.4 |

The above examples illustrate that fiber properties are substantially improved by a second redrawing and substantially unaffected by known solvents.

EXAMPLE 18

The procedure of example 1 is repeated, but the polymer of example 1 is substituted with a poly-(2,6-diphenyl-3-chloro- 1,4-phenylene) ether. Similar results are obtained.

It should be understood that the invention is susceptible to further change without departure from the scope thereof as defined by the following claims:

We claim:

1. A process for insolubilizing a fiber formed from a polyphenylene ether which is soluble in trichloroethylene and has at least 100 recurring units of the formula:

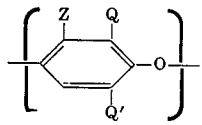

where Q is phenyl, Q' is aryl selected from the group consisting of phenyl, alkyl and halo substituted phenyl, biphenyl, terphenyl and naphthyl, and Z is hydrogen or halogen, said process comprising orienting said fiber in a stretching operation at a temperature of between about 220° C. and 300° C. at a stretch ratio of between 3.0 and 10.0 and thereafter treating the oriented fiber at a temperature of between 350° C. and 520° C. While maintaining the fiber under tension the ratio of fiber length under tension to oriented fiber length being from 0.3 to 5.0.

2. The process of claim 1 where Q' is phenyl and Z is hydrogen.

3. The process of claim 1 where the oriented fiber is treated at a temperature between 460° C. and 500° C.

4. The process of claim 1 where the ratio during subsequent treating of the oriented fiber is between 1.0 and 2.5.

5. A process for insolubilizing a fiber formed from a poly-(2,6-diphenyl-1-1,4-phenylene)ether which is soluble in trichloroethylene comprising orienting said fiber in a stretching operation at a temperature of from 200° to 300° C. at a stretch ratio of between 3.0 and 10.0 and thereafter treating the oriented fiber within a temperature range of between about 350° C. and 520° C. while maintaining the fiber under tension the ratio of fiber length under tension to oriented fiber length being from 0.3 to 5.3.

6. The process of claim 5 where the oriented fiber is treated at a temperature of between 460° and 500° C. and at a ratio of between about 1.0 and 2.5.

* * * * *

UNITED STATES PATENT OFFICE
CERTIFICATE OF CORRECTION

Patent No. 3,621,091                    Dated November 16, 1971

Inventor(s) J. J. Hertz and W. E. Salvadore

It is certified that error appears in the above-identified patent and that said Letters Patent are hereby corrected as shown below:

Col. 5, line 18, correct "220" to read -- 200 --;
Col. 5, line 22, correct "While" to read -- while --;
Col. 6, line 10, delete "1-"; and Col. 6, line 18, correct "5.3" to read -- 5.0 --.

Signed and sealed this 6th day of June 1972.

(SEAL)
Attest:

EDWARD M. FLETCHER, JR.                 ROBERT GOTTSCHALK
Attesting Officer                       Commissioner of Patents